United States Patent
Bylsma et al.

(10) Patent No.: US 8,437,805 B2
(45) Date of Patent: May 7, 2013

(54) METHOD AND APPARATUS FOR TRANSFORMING IMAGES TO ACCOMMODATE SCREEN ORIENTATION

(75) Inventors: Rodney Bylsma, Kanata (CA); Beejal Shah, Kanata (CA)

(73) Assignee: Research In Motion Limited (CA)

( * ) Notice: Subject to any disclaimer, the term of this patent is extended or adjusted under 35 U.S.C. 154(b) by 886 days.

(21) Appl. No.: 11/390,087

(22) Filed: Mar. 28, 2006

(65) Prior Publication Data

US 2007/0229536 A1    Oct. 4, 2007

(51) Int. Cl.
*H04B 1/38* (2006.01)
*G09G 5/00* (2006.01)
*G06K 9/36* (2006.01)

(52) U.S. Cl.
USPC ........... 455/566; 345/649; 345/645; 345/652; 345/672; 382/276

(58) Field of Classification Search .................. 455/566; 345/649, 645, 652, 672; 382/276
See application file for complete search history.

(56) References Cited

U.S. PATENT DOCUMENTS

| | | | |
|---|---|---|---|
| 5,131,080 A | | 7/1992 | Fredrickson et al. |
| 6,275,622 B1 * | | 8/2001 | Krtolica ....................... 382/296 |
| 7,002,604 B1 * | | 2/2006 | Barrus et al. ................. 345/649 |
| 2003/0164846 A1 * | | 9/2003 | Ottesen et al. ............... 345/723 |
| 2004/0239690 A1 * | | 12/2004 | Wyatt et al. .................. 345/649 |
| 2005/0232504 A1 * | | 10/2005 | Suzuki et al. ................ 382/246 |

FOREIGN PATENT DOCUMENTS

| | | |
|---|---|---|
| EP | 0 149 119 A | 7/1985 |
| EP | 0589724 A2 | 3/1994 |
| EP | 0 744 711 A | 11/1996 |
| EP | 1 023 694 A | 8/2000 |

OTHER PUBLICATIONS

EP 06111823, Examination Report dated Jul. 2, 2009.
Denning PJ: "The Locality Principle": Communications of the ACM, vol. 48, No. 7, Jul. 2005, pp. 19-24.
EP 06111823, Search Report dated Aug. 14, 2006.
EP 06111823, Examination Report dated Sep. 19, 2008.
Jon Bentley: "Programming Pearls", second edition, ACM Press, New York, 2000, pp. 17, 191-195.
EP Application No. 06111823.8, Communication pursuant to Article 94(3) EPC dated Oct. 22, 2010.
EP Application No. 06111823.8, Communication pursuant to Article 94(3) EPC dated Oct. 12, 2011.
EP Application No. 06111823.8, Communication pursuant to Article 94(3) EPC dated May 16, 2012.
John P. Hayes: "Computer Architecture and Organization", 1988, McGraw Hill, pp. 376-449.

* cited by examiner

*Primary Examiner* — Kamran Afshar
*Assistant Examiner* — Omoniyi Obayanju
(74) *Attorney, Agent, or Firm* — Moffat & Co.

(57) ABSTRACT

A method and apparatus for transforming a display image on a display from a first orientation to a second orientation, the method having the steps of: breaking up the display image into multiple sub-images; and transforming each of the multiple sub-images individually, the transforming step including selecting a pixel, determining a transformed location for the pixel, and writing the pixel to a display buffer.

12 Claims, 8 Drawing Sheets

METHOD AND APPARATUS FOR TRANSFORMING IMAGES TO ACCOMMODATE SCREEN ORIENTATION

FIELD OF THE INVENTION

The present application relates to a method and device for transforming images between a first orientation and a second orientation, and in particular relates to the improved transformation to reduce cache misses on a mobile device.

BACKGROUND

As mobile devices and mobile data devices become more complex, one option being introduced by device manufacturers is to include client software on the mobile device. Specifically, the mobile device manufacturer can create hardware and some software for the mobile device to operate. However, a different software maker can provide specialized software, such as e-mail applications, calendar applications and other data or non-data functionality.

In operation, the mobile device provides a platform for running the client software, which when integrated with the third party mobile device, provides an enhanced experience for the user.

Client software can, in some cases, be designed for a particular display orientation. For example, a typical device that the client resides on could have the display oriented in a landscape orientation over a keyboard. The device may expect to write to a display in this way and the addressing of output to the display is configured for this orientation.

If the client software is however provided on a device in which the display is oriented in a different orientation to that expected from the client, modifications to the client need to be made. One option is to change the client itself to accommodate the differently oriented display. This is however an onerous task and undesirable from a software creation perspective. A better solution is to provide a transformation function between the output from the client and the display in order to ensure that contents are displayed in the correct orientation.

Transformation functions often take a row of data from the first orientation and transfer it into a column in the second orientation. The problem with this is that it is relatively data intensive and can cause cache misses when the cache overflows. These cache misses require reloading of the data and delay the overall transformation.

BRIEF DESCRIPTION OF THE DRAWINGS

The present application will be better understood with reference to the drawings, in which.

DETAILED DESCRIPTION OF THE DRAWINGS

The present method and device overcome the disadvantages of the prior by breaking an image into smaller pieces to reduce cache misses and then performing a transformation on these smaller portions. Rather than transforming and updating the entire image as a whole, the smaller images ensure that cache misses are avoided and can thereby speed up the entire transformation process.

In a preferred embodiment, an image on a mobile device can be broken up into slices and each of these areas are transformed separately. However, other configurations, such as quadrants or even smaller images are possible depending on the screen size being transformed and the cache size of the device.

The present application therefore provides a method for transforming a display image from a first orientation to a second orientation, the method comprising the steps of: breaking up the display image into multiple sub-images; and transforming each of said multiple sub-images individually, said transforming step including selecting a pixel, determining a transformed location for said pixel, and writing the pixel to a display buffer.

The present application further provides a mobile device adapted to transform a display image from a first orientation to a second orientation, the mobile device having a radio subsystem including a radio adapted to communicate with a network; a radio processor having a digital signal processor and adapted to interact with said radio subsystem; memory; a user interface; a processor adapted to run user applications and interact with the memory, the radio and the user interface and adapted to run applications, the mobile device characterized by having means for: breaking up the display image into multiple sub-images; and transforming each of said multiple sub-images individually, said transforming step including selecting a pixel, determining a transformed location for said pixel, and writing the pixel to a display buffer.

Figure 1:
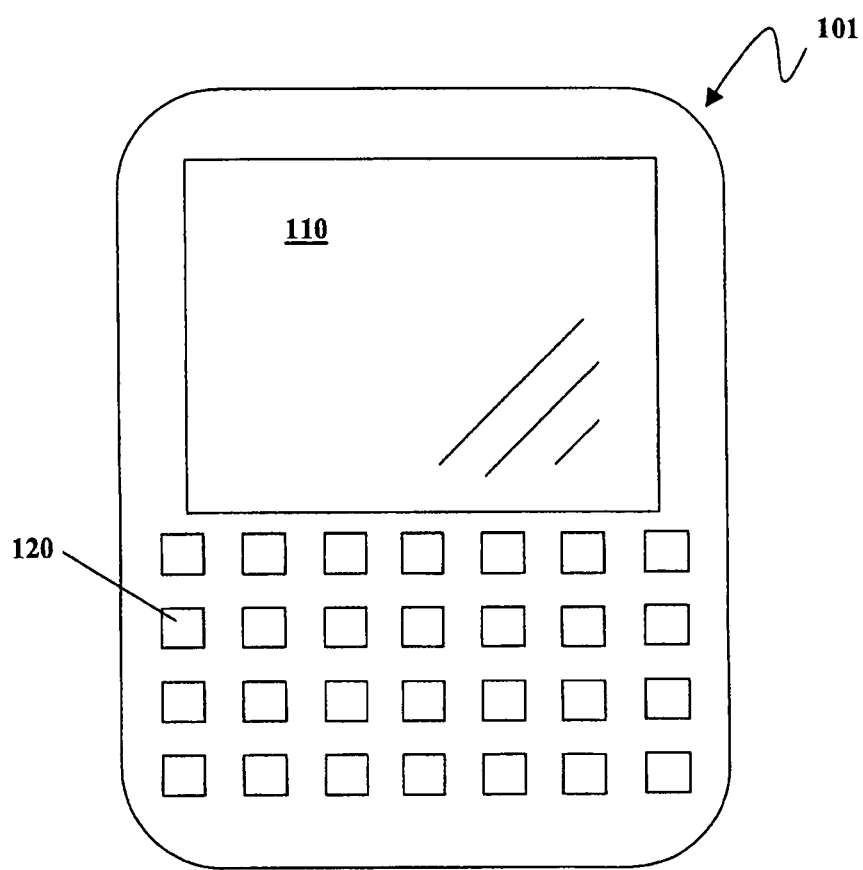
FIG. 1 is a schematic view of an exemplary mobile device.

Reference is now made to FIG. 1. FIG. 1 illustrates an exemplary mobile device 101 having a display 110 and a keyboard 120. A more detailed description of an exemplary mobile device is presented below with regard to FIG. 11.

Depending on the hardware within mobile device 101, display 110 can be configured to be refreshed in a landscape mode or a portrait mode. This can cause problems for software that is written with a specific display format for its output.

For example, a client can be added to the mobile device 101 that would provide for certain data functions to be performed by mobile device 101. This software can be configured to output to a display 110 in which display 110 is oriented in, for example, a landscape mode and the base pixel is located at the top left hand corner of the display.

When the same piece of software is put onto a second mobile device in which the hardware is adapted to output to a display 110 configured in a different orientation, for example a portrait mode, the software output will not be able to be displayed properly unless a transformation is performed.

Similarly, some mobile device manufacturers allow a user to change the orientation of a mobile device display 110 at run time, and this change in orientation requires a transformation to be performed.

Figure 2:
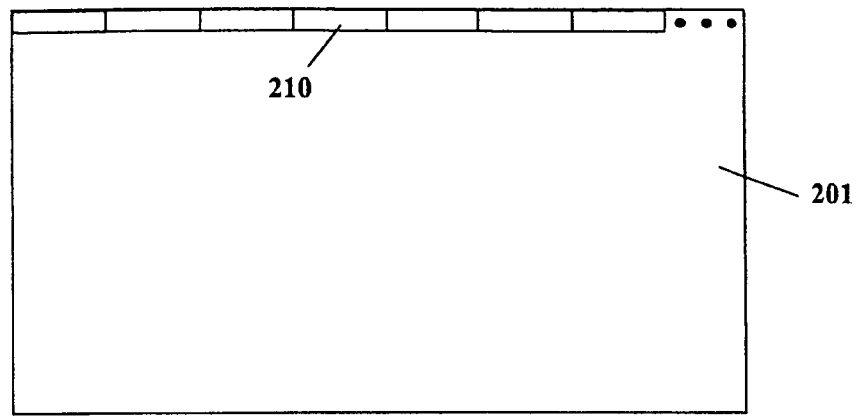
FIG. 2 is a schematic view of a display showing a first row of cache lines oriented for a landscape format addressing.

Reference is made to FIG. 2. FIG. 2 shows an exemplary display image 201 with a partial first row of cache lines 210 illustrated. As will be appreciated, rather than reading a single word or byte from memory at a time, each cache entry usually holds a certain number of words, known as a "cache line", and a whole line is read and cached at once. Each cache line 210 will contain several pixels depending on the size of a pixel. Further, each cache line will correspond with a "line" in the display buffer, as explained below.

Each pixel has a specific data size depending on color configuration for the mobile device. For example if the display is black and white, each pixel may be represented by 1 bit. A display with 256 colors will require 8 bits for each pixel. A display with more colors will require more bits to represent each pixel. The size of each pixel will determine how many pixels fit into a cache line.

In one embodiment, display image 201 is 320 pixels by 240 pixels. Other display image sizes are possible.

Figure 3:
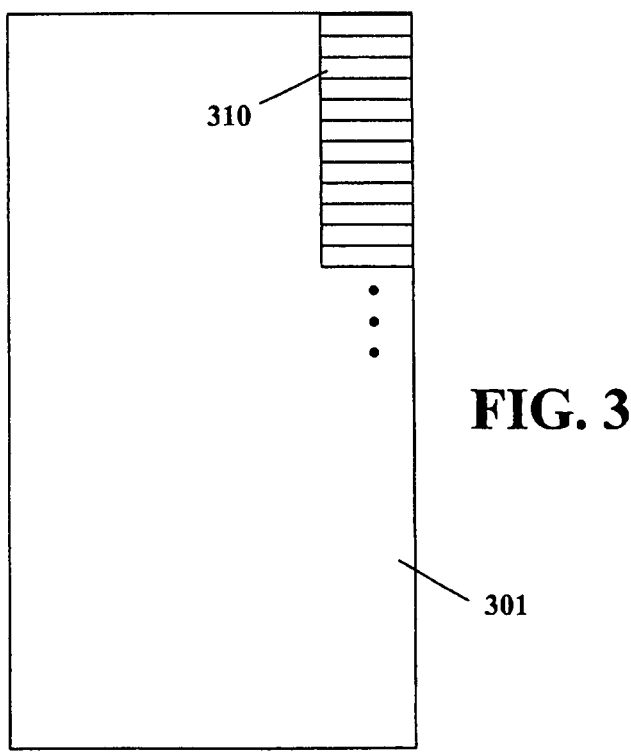
FIG. 3 is an exemplary display showing a first row of cache lines in which the pixels are configured to be oriented in a portrait format.

FIG. 3 shows a display image 301 in which the hardware is configured to refresh and write to display image 301 in a portrait mode. As illustrated in the example of FIG. 3, the pixels start at the base address in the top right hand corner of display image 301. Display image 301 is, for example, 240 by 320 pixels.

FIG. 3 shows a partial first row of cache lines 310 having multiple pixels in this portrait mode.

In order to perform the transformation between the display image 201 of FIG. 2 and the display image 301 of FIG. 3, a mobile device needs to perform a pixel by pixel copy of the image from a temporary (virtual) buffer to the LCD device frame buffer. The LCD device frame buffer is the buffer the LCD display uses to refresh itself and would ordinarily be the buffer the software writes its output to. However, since the screen orientation is different here, the software instead writes to a virtual buffer first. A transformation then needs to be performed between the virtual buffer and the LCD device frame buffer.

Both the virtual buffer and LCD device frame buffer have "lines" having multiple pixels. A line is written to the display in the orientation shown for cache lines 210 and 310 in FIGS. 2 and 3. Thus, as will be appreciated, a first line for the display of FIG. 2 will contain pixels for multiple lines for the display of FIG. 3, and vice versa.

The nature of the transformation between the display orientations means that read/write access to one of the buffers is not sequential. Since each line in the buffers include several pixels grouped together, the transformation requires a line from the virtual buffer to be broken into multiple lines in the LCD display buffer. For example, if a line in the virtual buffer contains eight pixels, these eight pixels will be broken into eight lines in the LCD display buffer. Further, to complete the lines in the LCD display buffer other lines from the virtual buffer will need to also be transformed. Since multiple cache lines are required to perform the transformation, cache misses are possible, causing the LCD update time to be large, which may not support animation.

To accommodate this transformation, one option is to update the hardware to allow for the cache size required for the transformation. However, since the clients' software often resides on hardware manufactured by a third party, it is not always possible to update the hardware. Further, hardware updates may be undesirable due to the expense added to a device, the redesign required, or for other reasons known to those skilled in the art. Also, a mobile device manufacturer may not want to add extra hardware such as graphics cards to just to be able to support a change in the screen orientation.

An alternative is to reduce the number of cache misses when performing the transform. The present application accomplishes this by breaking up the display into smaller sized areas, and performing a transformation on each of these areas separately.

Figure 4:
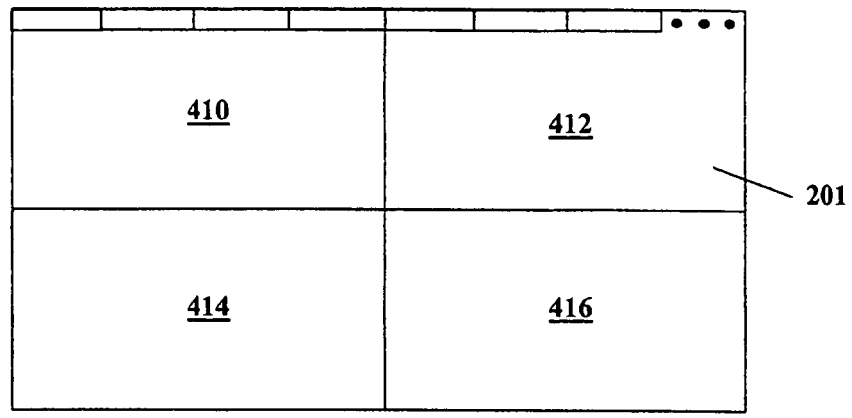
FIG. 4 is an exemplary display showing a first row of cache lines in which the pixels are configured to be oriented in a landscape format, with the display broken down into multiple images.
Figure 5:
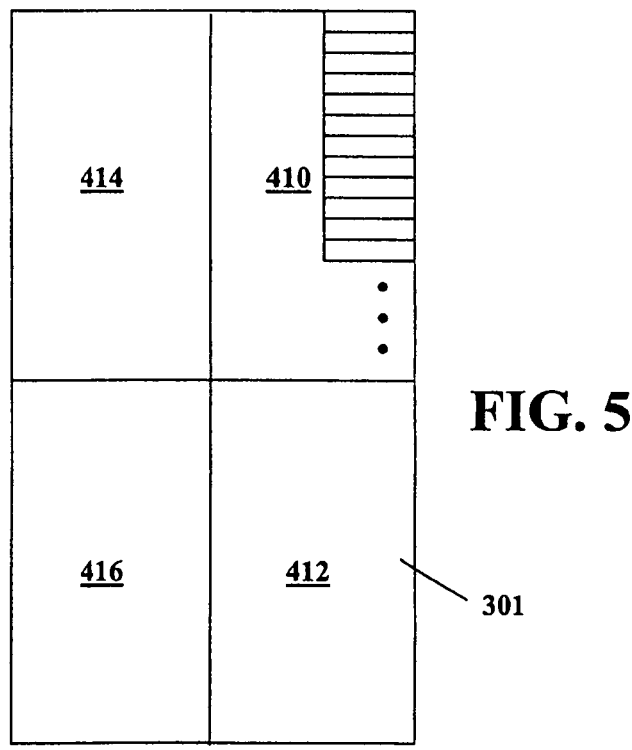
FIG. 5 is an exemplary display showing a first row of cache lines in which the pixels are configured to be oriented in a portrait format, with the display broken down into multiple images.

Reference is now made to FIG. 4. FIG. 4 shows the display image 201 broken into four separate transformation areas (referred to herein as sub-images). Each of these sub-images 410, 412, 414 and 416, are transformed individually and written into the corresponding sub-image 410, 412, 414 and 416 within display image 301, as illustrated in FIG. 5. This is accomplished by transforming each of sub-images 410, 412, 414 and 416 separately.

FIG. 4 is illustrative of one example in which the figure has been broken down into four sub-images 410, 412, 414 and 416. The display image 201 could be broken down into other numbers of sub-images, and various factors can be used to determine the number of sub-images to break the display image 201 into. Further, multiple sub-images could be all of the same size in terms of dimensions and/or in terms of number of pixels. Alternatively, the multiple sub-images could include sub-images that have different sizes.

Figure 6:
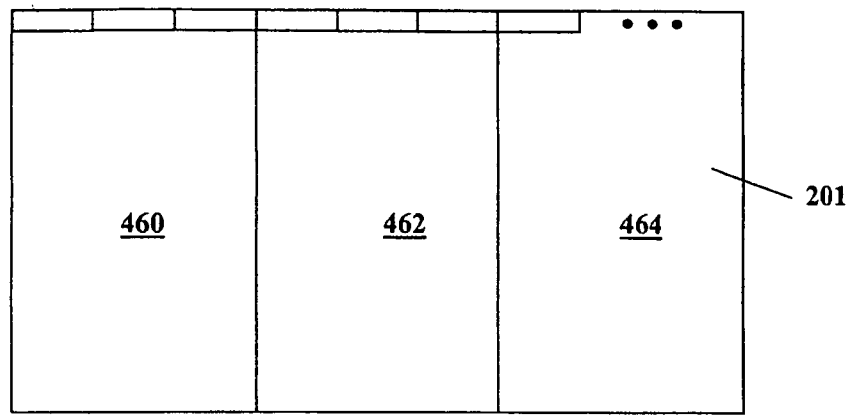
FIG. 6 is an exemplary display showing a first row of cache lines in which the pixels are configured to be oriented in a landscape format, with the display broken down into multiple images.
Figure 7:
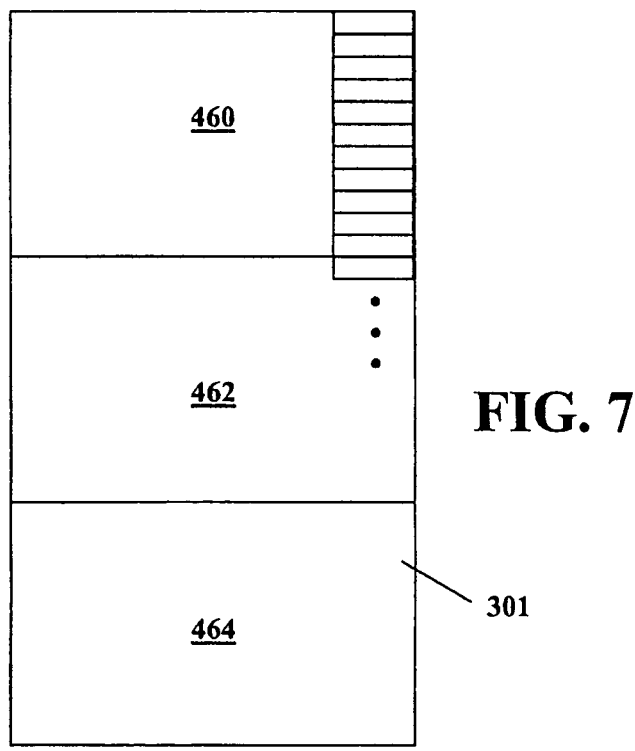
FIG. 7 is an exemplary display showing a first row of cache lines in which the pixels are configured to be oriented in a portrait format, with the display broken down into multiple images.

An alternative example is illustrated in FIGS. 6 and 7. Since the cache line is important in this case, the width of a sub-image is important. Thus it may not be necessary to break the image into quadrants or other number of images where there is a break in the height of the image. Instead, cache misses may be avoided by simply breaking the image into "slices".

Referring to FIG. 6, the display image 201 is thus broken down into sub-images 460, 462 and 464. The use of three "slices" is merely provided as an example, and one skilled in the art will realize that as few as two sub-images (i.e. the display image is cut in two) could be used, or multiple slices could be used, depending on the cache and image size.

As seen in FIG. 7, sub-images 460, 462 and 464 are rotated for the new screen orientation for display image 301.

It will be appreciated that the transformation could occur in the other direction, that is from display image 301 in FIG. 7 to display image 201 in FIG. 6, if client software is written for a device having the orientation of display image 301 and the client is added to a mobile device with the orientation of display image 201, or if the device orientation can be changed at run time from the display image 301 in FIG. 7 to the display image 201 in FIG. 6.

One factor in determining the number of sub-images the display image is to be broken into is the cache size of the device. In a preferred embodiment, the display image is broken into sub-images that would fit into the cache without causing cache misses.

A second factor is the overhead required to break images down. Breaking an image into sub-images that are much smaller than the cache size when performing a transformation requires more processing overhead and does not result in fewer cache misses. The extra overhead reduces some of the benefits of the above. Specifically, if a user breaks a display down into eight separate sub-images, when a one-quarter sized sub-image would avoid cache misses, the eight separate transformations cause increased overhead and do not reduce the number of cache misses.

Figure 8:
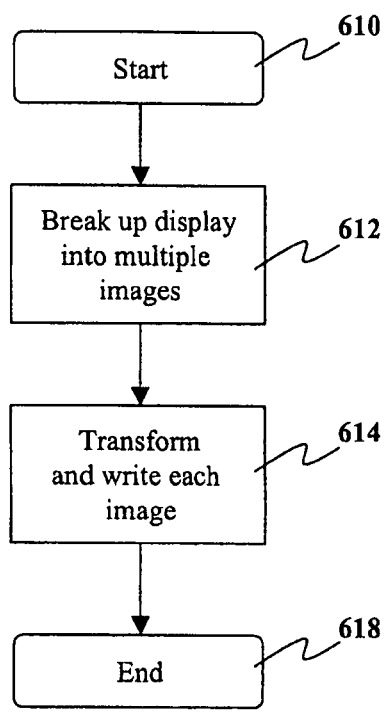
FIG. 8 is a flow chart of a method of the present application.

Reference is now made to FIG. 8. FIG. 8 shows a flow chart of a transformation process. The process is started at starting step 610 and proceeds to step 612. In step 612, the present method breaks up the display image into multiple sub-images. In step 614 each of these sub-images are transformed to accommodate the differing orientation as described above.

The transformation in step 614 comprises reading a pixel from the virtual buffer containing the sub-image and determining where the pixel should be placed in the transformed image. Step 614 further includes the step of writing the pixel to the display/frame buffer (such as an LCD buffer).

In one embodiment, step 614 can include a loop for both the X and Y axes of the sub-image. Each pixel is stepped through with the two loops, and as each is read, it is written to the display/frame buffer (such as an LCD buffer). One skilled in the art will however appreciate that the order in which pixels are examined and transformed is not critical to the operation of the method of the present application.

Figure 9:
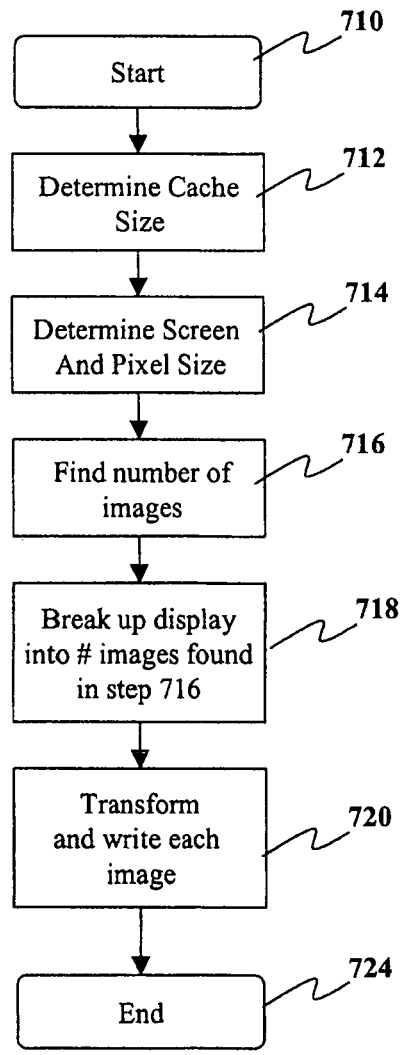
FIG. 9 is an alternative method where the number of images a display is to be broken into is determined prior to a transformation.

Reference is now made to FIG. 9. FIG. 9 shows an alternative embodiment to that of FIG. 8 in which the number of sub-images to break the display into is chosen dynamically. Specifically, in step 710 the process is started and the cache size is determined in step 712.

In step 714 the resolution in terms of pixel size and the size of the display is determined and, based on this and the cache size determined in step 712, the number of sub-images that the display needs to be broken into to avoid cache misses is determined in step 716.

Based on the number determined in step 716, the process next proceeds to step 718 in which the display is broken into the number of sub-images found in step 716.

From step 718 the process proceeds to step 720 in which each sub-image is transformed and written to the LCD buffer. As with the method of FIG. 8, this is done by selecting a pixel from the virtual buffer, determining where it should be placed, and writing the pixel to the LCD buffer. This is further preferably done within 2 loops; one that loops for the size of the sub-image in the X axis and the other for the Y axis. The order of examining and transforming pixels is however not critical to the operation of the present application. One skilled in the art will also realize that the sub-image size is a fraction of the display image size. The process next proceeds to step 724 in which the process is ended.

Figure 10:
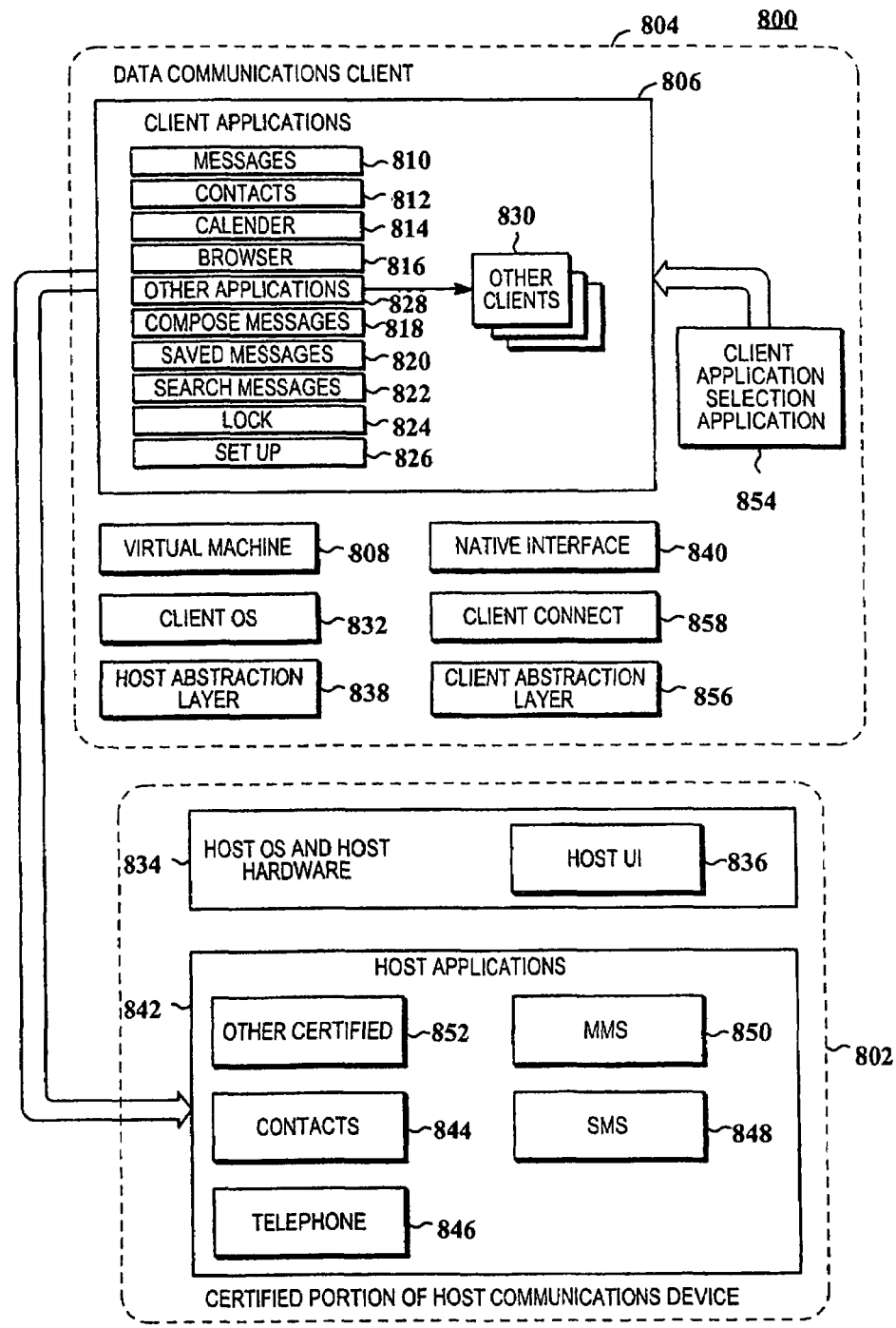
FIG. 10 is a schematic view of an exemplary client/host architecture of a mobile device that can be used in accordance with a preferred embodiment.

Reference is now made to FIG. 10. FIG. 10 is an exemplary schematic diagram of a mobile device, and in particular the divided architecture of a third party mobile device host and client software. The mobile device includes a divided architecture 800 with a certified portion of a host communications device 802 as well as a data communications client 804. As will be appreciated by those skilled in the art, since the host device 802 is certified, a data communications client 804 does not need to be certified in order to send and receive communications over the wireless network. Communication from data communications client 804 utilizes the certified portion of host communication device 802 to perform communication over the wireless network.

The divided architecture 800 of FIG. 10 includes client applications 806 running on top of a virtual machine 808. The client applications 806 can be any application that is designed to run on the virtual machine 808 in the data communications client 804, and may include a messages application 810 for viewing messages that have been received, a contacts application 812 to present an address book including phone numbers, e-mail addresses or other contact information for individuals or companies, calendar application 814 for scheduling appointments and managing time, a browser application 816 for browsing the internet or other network, a compose-message application 818 to compose messages for Short Message Service ("SMS") or e-mail, a saved-messages application 820 to view messages that have been saved, a search-messages application 822 to search for a particular message, a lock application 824 to lock the keyboard and screen of the host device, and a set-up application 826 to change the set-up configuration for the data communications client 804. Other applications 828 could also exist as part of client applications 806 and the above-listed applications are not meant to be limiting. Further, other clients 830 besides the data communications client 804 could exist on the certified host communications device 802 and these other clients 830 could have applications which could be invoked from the other applications 828. The virtual machine 808 is preferably started at power-up of the certified host communications device 802 and continues to run as long as the certified host communication device 802 is in operation. The virtual machine 808 may be a Java virtual machine and client applications 806 may be Java applications. All client applications 806 use the virtual machine 808 to invoke instances of objects created by the client applications 806.

A feature call on the divided architecture 800 from the client applications 806 would normally go through a client OS 832. The client OS 832 may include a number of primitives for interacting with host OS and host hardware 834, which includes a host user interface 836. However, in the case that the client applications 806 are built onto the certified host communications device 802 and because the certified host communications device 802 has already acquired certification for its host dependent features such as hardware, software and firmware utilized for communication with a network, it is preferable to have the client OS 832 interact with a host abstraction layer 838 instead of having the client OS 832 directly interacting with the features. The host abstraction layer 838 converts calls from the client applications 806 to host calls through a native interface 840. The native interface 840 invokes host applications 842 in order to use the host dependent features on the certified host communications device 802. The host applications 842 may include a variety of applications such as, but not limited to, a host contacts application 844 including an address book having phone numbers, e-mail addresses or other contact information for individuals or companies, a telephone-related application 846, an SMS application 848, a multi-media message service ("MMS") application 850, and other certified applications 852. These individual host applications are started within the host application 842, and a request from the client application 806 is sent through the client OS 832 to the host abstraction layer 838 where the request is converted with the native interface 840 for the host applications 842.

Because the host applications 842 invoke the features of the certified host communications device 802 rather than the client applications 806 directly utilizing the features, the divided architecture 800 enables the client applications 806 to run in a host environment and use the features of the certified host communications device 802 without having to re-certify. The divided architecture 800 therefore enables the uncertified client, which is the data communications client 804, to be added to the certified host communications device 802 after certification, including an after-market addition to the certified host communications device 802.

One example of a client application using the above described method and system includes the making of a telephone call when the certified host communications device 802 is a cellular telephone. In the host environment, making of the telephone call simply involves using the host applications 842 to create the telephone call where the host applications 842 use certified hardware, firmware and software to connect through a wireless system. However, in the client applications 806, the above described divided architecture 800 requires invoking one of the host applications 842 in order to make the telephone call. The invoked client application could be the address book associated with the contacts application 812, which includes phone numbers for individuals. A user may wish to select a telephone number of a particular individual from the address book associated with the contacts application 812, and to have the cellular telephone, which is the certified host communications device 802 in this example, to make a call to that particular individual. In order to accomplish this task, the user may select the telephone number and select an option to dial that phone number. In this case, the contacts application 812 indicates through the virtual machine 808 to the client OS 832 that it needs to make a telephone call. Instead of using the host dependent feature directly from the client OS 832, a notification is sent to the host abstraction layer 838, which invokes an appropriate application of the host applications 842 through the native interface 840, to make the telephone call. In this example, the invoked host application would be the telephone-related application 846, which starts the telephone call, and the user proceeds as if the telephone call had been started from the client applications 806.

The client applications 806 may also provide the user an option to use the SMS application 848 or the MMS application 850 to contact the individual instead of dialing the telephone number. In each of these cases, a different application of the host applications 842 is invoked, but this task is accomplished similarly through the host abstraction layer 838 and the native interface 840. Alternatively, the messages application 810, which includes a telephone number, may be invoked from the client applications 806.

As one skilled in the art will realize, data is supplied between the client applications 806 and the host applications 842. In the example above, the telephone number would be supplied to the host application 842 including the telephone-related application 846, the SMS application 848, and the MMS application 850.

It is further desirable to be able to activate a selected client application of the client applications 806 from one of the host applications 842. A client application selection application 854 uses a client abstraction layer 856 to activate an application within the client applications 806. The client application selection application 854 calls a function that is translated in the client abstraction layer 856. The client abstraction layer 856 then uses the virtual machine 808 to activate the selected client application of the client applications 806. The client abstraction layer 856 may either inject the client OS 832 event into the virtual machine 808 causing the selected client application of the client applications 806 to become active or, alternatively, may perform a "reverse native call" through the client OS 832 or via a client connect 858 to manipulate the native representation of some client object causing the selected client application of the client application 806 to become active. The client connect 858 can be used for network features for the client applications 806, which enables, for example, the data communications client 804 to communicate using a specific protocol that was not originally supported on the certified host communications device 802. The client connect 858 involves a protocol stack to perform this communication between the data communications client 804 and the certified host communications device 802, and increases and improves client functionality.

Figure 11:
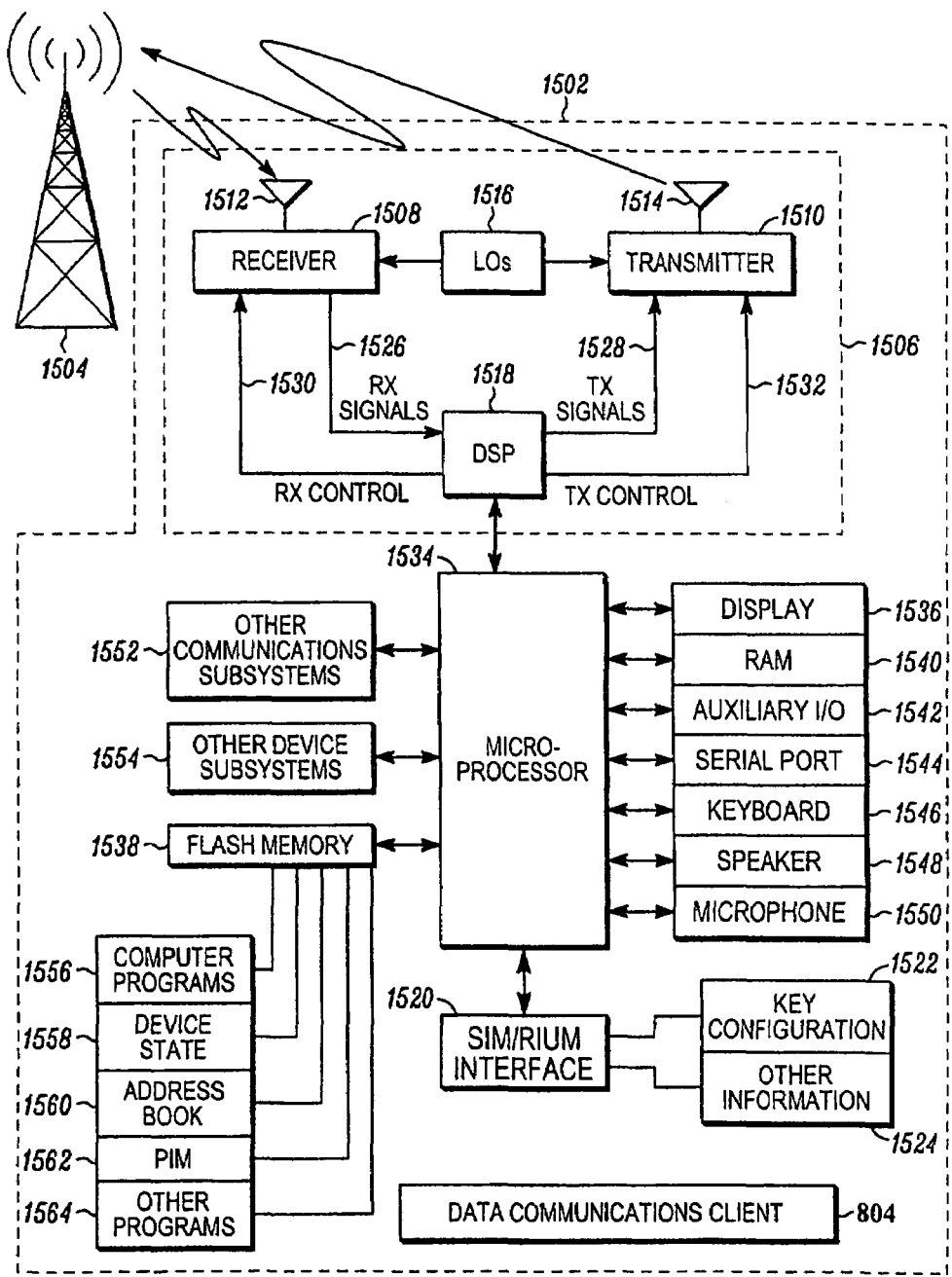
FIG. 11 is a schematic view of the mobile device of FIG. 10.

FIG. 11 is a block diagram 1500 of an exemplary host mobile device 1502 in wireless communication with a communication network 1504 that the present system and method may emulate. The host mobile device 1502 is preferably a two-way wireless communication device having at least voice and data communication capabilities, and preferably also has the capability to communicate with other computer systems on the Internet. Depending on the exact functionality provided, the host mobile device 1502 may be referred to as a data messaging device, a two-way pager, a wireless e-mail device, a cellular telephone with data messaging capabilities, a wireless Internet appliance, or a data communication device, as examples.

Where the host mobile device 1502 is enabled for two-way communication, it will incorporate a communication subsystem 1506, including both a receiver 1508 and a transmitter 1510, as well as associated components such as one or more, preferably embedded or internal, a receiver antenna 1512 and a transmitter antenna 1514, local oscillators ("LO"s) 1516, and a processing module such as a digital signal processor ("DSP") 1518. As will be apparent to those skilled in the field of communications, the particular design of the communication subsystem 1506 will be dependent upon the communication network in which the device is intended to operate. For example, host mobile device 1502 may include the communication subsystem 1506 designed to operate within the Mobitex™ mobile communication system, the DataTAC™ mobile communication system, General Packet Radio Service ("GPRS") network, Universal Mobile Telecommunications System ("UMTS") network, Enhanced Data for Global System for Mobile Communications ("GSM") Evolution ("EDGE") network or Code Division Multiple Access ("CDMA") network.

Network access requirements will also vary depending upon the type of network 1504. For example, in the Mobitex and DataTAC networks, the host mobile device 1502 is registered on the communication network 1504 using a unique identification number associated with each mobile device. In UMTS and GPRS networks, and in some CDMA networks, however; network access is associated with a subscriber or user of the host mobile device 1502. A GPRS mobile device therefore requires a subscriber identity module ("SIM") card in order to operate on a GPRS network, and a Removable User Identity Module ("RUIM") in order to operate on some CDMA networks. Although the host mobile device 1502 would not fully function without a valid SIM/RUIM card if it is a GPRS/UMTS/CDMA mobile device, local or non-network communication functions, as well as legally required functions (if any) such as "911" emergency calling, may still be available. However, the host mobile device 1502 will be unable to carry out any other functions involving communications over the communication network 1504. A SIM/RUIM interface 1520, which is configured to accept a SIM/RUIM card, is normally similar to a card-slot into which the SIM/RUIM card can be inserted and ejected like a diskette or a Personal Computer Memory Card International Association ("PCMCIA") card. The SIM/RUIM card can have approximately 64K of memory and hold many key configuration 1522, and other information 1524 such as identification, and subscriber related information.

When required network registration or activation procedures have been completed, the host mobile device 1502 may send and receive communication signals over the communication network 1504. Signals received by the receiver antenna 1512 from the communication network 1504 are input to the receiver 1508, which may perform such common receiver functions as signal amplification, frequency down conversion, filtering, channel selection and the like, and in the example system shown in FIG. 11, analog to digital ("A/D") conversion. A/D conversion of a received signal allows more complex communication functions such as demodulation and decoding to be performed in the DSP 1518. In a similar manner, signals to be transmitted are processed, including modulation and encoding for example, by the DSP 1518 and input to the transmitter 1510 for digital to analog ("D/A") conversion, frequency up conversion, filtering, amplification and transmission over the communication network 1504 via the transmit antenna 1514. The DSP 1518, in addition to processing receive and transmit communication signals 1526 and 1528, provides for receiver and transmitter controls 1530 and 1532. For example, the gains applied to communication signals in the receiver 1508 and the transmitter 1510 may be adaptively controlled through automatic gain control algorithms implemented in the DSP 1518.

The communication network 1504 may further communicate with multiple systems (not shown). For example, the communication network 1504 may communicate with both an enterprise system and a web client system in order to accommodate various clients with various service levels.

The host mobile device 1502 preferably includes a microprocessor 1534, which controls the overall operation of the host mobile device 1502. Communication functions, including at least data and voice communications, are performed through the communication subsystem 1506. The microprocessor 1534 also interacts with further device subsystems such as flash memory 1536, a display 1538, random access memory ("RAM") 1540, auxiliary input/output (I/O) subsystems 1542, a serial port 1544, a keyboard 1546, a speaker 1548, a microphone 1550, other communications subsystem 1552, and any other compatible device subsystems, which is generally designated as 1554. Some of the subsystems shown in FIG. 11 perform communication-related functions, whereas other subsystems may provide "resident" or on-device functions. Notably, some subsystems, such as the keyboard 1546 and the display 1538, for example, may be used for both communication-related functions, such as entering a text message for transmission over a communication network, and device-resident functions such as a calculator or task list.

Operating system software used by the microprocessor 1534 is preferably stored in a persistent store such as the flash memory 1538, which may instead be a read-only memory ("ROM") or similar storage element (not shown). Those skilled in the art will appreciate that the operating system, specific device applications, or parts thereof, may be temporarily loaded into a volatile memory such as the RAM 1540. Received communication signals may also be stored in the RAM 1540.

As shown in FIG. 11, the flash memory 1536 can be segregated into different areas for both computer programs 1556 and program data storage such as device state 1558, an address book 1560, personal information manager ("PIM") 1562, and other programs 1564. These different storage types indicate that each program can allocate a portion of the flash memory 1536 for their own data storage requirements. The microprocessor 1534, in addition to its operating system functions, preferably enables execution of software applications on the host mobile device 1502. A predetermined set of applications that control basic operations, including at least data and voice communication applications for example, will normally be installed on the host mobile device 1502 during manufacturing. A preferred software application may be a PIM application having the ability to organize and manage data items relating to the user of the host mobile device 1502 such as, but not limited to, e-mail, calendar events, voice mails, appointments, and task items. Naturally, one or more memory stores would be available on the host mobile device 1502 to facilitate storage of PIM data items. Such PIM application would preferably have the ability to send and receive data items, via the communication network 1504. In a preferred embodiment, the PIM data items are seamlessly integrated, synchronized and updated, via the communication network 1504, with the host mobile device user's corresponding data items stored or associated with a host computer system. Additional applications may also be loaded onto the host mobile device 1502 through the communication network 1504, the auxiliary I/O subsystem 1543, the serial port 1544, other communications subsystem 1552 or any other compatible device subsystem 1554, and be installed by the user in the RAM 1540 or preferably a non-volatile store (not shown) for execution by the microprocessor 1534. Such flexibility in application installation increases the functionality of the host mobile device 1502 and may provide enhanced on-device functions, communication-related functions, or both. For example, secure communication applications may enable electronic commerce functions and other such financial transactions to be performed using the host mobile device 1502.

In a data communication mode, a received signal such as a text message or web page download will be processed by the communication subsystem 1506 and input to the microprocessor 1534, which preferably further processes the received signal for output to the display 1538, or alternatively to the auxiliary I/O subsystems 1542. The user of the host mobile device 1502 may also compose data items such as e-mail messages for example, using the keyboard 1546, which is preferably a complete alphanumeric keyboard or telephone-type keypad, in conjunction with the display 1538 and possibly with the auxiliary I/O subsystems 1542. Such composed items may then be transmitted over the communication network 1504 through the communication subsystem 1506.

For voice communications, overall operation of the host mobile device 1502 is similar, except that the received signals would preferably be output to the speaker 1548 and signals for transmission would be generated by the microphone 1550. Alternative voice or audio I/O subsystems, such as a voice message recording subsystem, may also be implemented on the host mobile device 1502. Although voice or audio signal output is preferably accomplished primarily through the speaker 1548, the display 1538 may also be used to provide an indication of the identity of a calling party, the duration of a voice call, or other voice call related information for example.

The serial port 1544, such as Universal Serial Bus ("USB"), in FIG. 11 would normally be implemented in a personal digital assistant ("PDA")-type host mobile device for which synchronization with a user's desktop computer (not shown) may be desirable, but is an optional device component. The serial port 1544 would enable the user to set preferences through an external device or software application and would extend the capabilities of the host mobile device 1502 by providing for information or software downloads to host mobile device 1502 other than through a wireless communication network. An alternate download path may for example be used to load an encryption key onto the device through a direct and thus reliable and trusted connection to thereby enable secure device communication. Other communications subsystems 1552, such as a short-range communications subsystem, is a further optional component which may provide for communication between the host mobile device 1502 and different systems or devices, which need not necessarily be similar devices. For example, the other communications subsystem 1552 may include an infrared device and associated circuits and components or a Bluetooth™ communication module to provide for communication with similarly enabled systems and devices.

Although many services may be available on a given network, only those subscribers who use mobile communications devices that have been provisioned for those services will be able to benefit from them. This limitation may present problems for both the subscriber and the network operator. On one hand, the subscriber may desire an existing service he does not have, i.e. an upgrade, or desire disabling a service, i.e. a downgrade. On the other hand the operator may want to offer a new service, but may hesitate if subscribers cannot benefit from them. One known solution is to provide an out of band communications link, such as a Universal Serial Bus ("USB"), on the mobile communications device, and enable the subscriber to load new software onto the mobile communications device via the out of band communication link using a personal computer, thus re-provisioning the mobile communications device. This solution may be an unacceptable solution to both the subscriber and the operator as there is a significant risk that the mobile communications device, by error, receives a wrong or incomplete load, and may require servicing. Furthermore, this solution may be unacceptable to the subscriber who does not have access to a personal computer. However, because the host mobile device 1502 is a host communications device that hosts the data communications client 804, the data communications client 804 may be provisioned directly by the user of host mobile device 1502.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

We claim:

1. A method for transforming a display image on a mobile device from a first orientation to a second orientation, the mobile device comprising a main memory, a cache having a predetermined size and a display buffer, the method comprising the steps of:
   a) breaking up the display image into n sub-images, wherein n is the smallest possible integer for which the size of the image, divided by n, is less than the size of the cache; and
   b) transforming each of said sub-images individually, said transforming step including selecting a pixel of a sub-image stored in the cache, determining a transformed location for said pixel in the display buffer, and writing the pixel to the display buffer at the determined location.

2. The method of claim 1, wherein said sub-image size is determined based on a number of bits for each pixel and the number of pixels in a row of the sub-image.

3. The method of claim 1, wherein said breaking up step creates multiple sub-images, each sub-image having the same size.

4. The method of claim 1, wherein said breaking up step creates multiple sub-images having differing sizes.

5. The method of claim 1, wherein the first orientation is one of portrait or landscape, and the second orientation is the other of portrait or landscape.

6. The method of claim 5, wherein said transforming step uses a top left corner as a landscape reference and a top right corner as a portrait reference.

7. A mobile device configured to transform a display image on the mobile device from a first orientation to a second orientation, the mobile device having a display, a display buffer, a cache having a predetermined cache size, a radio subsystem including a radio configured to communicate with a network; a radio processor having a digital signal processor and configured to interact with said radio subsystem; memory; a user interface; a processor configured to run user applications and interact with the memory, the radio and the user interface and configured to run applications, the processor and memory interacting to:
   a) break up the display image into n sub-images, wherein n is the smallest possible integer for which the size of the image, divided by n, is less than the size of the cache; and
   b) transform each of said multiple sub-images individually, the transforming including selecting a pixel of a sub-image stored in the cache, determining a transformed location for said pixel in the display buffer, and writing the pixel to the display buffer at the determined location.

8. The mobile device of claim 7, wherein said sub-image size is determined based on a number of bits for each pixel and the number of pixels in a row of the image.

9. The mobile device of claim 7, wherein the processor and memory interact to create multiple sub-images, each sub-image having the same size.

10. The mobile device of claim 7, wherein the processor and memory interact to create multiple sub-images having differing sizes.

11. The mobile device of claim 7, wherein the first orientation is one of portrait or landscape, and the second orientation is the other of portrait or landscape.

12. The mobile device of claim 11, wherein the processor and memory interact to transform by using a top left corner as a landscape reference and a top right corner as a portrait reference.

* * * * *